US006941397B2

(12) United States Patent
Learmonth

(10) Patent No.: US 6,941,397 B2

(45) Date of Patent: Sep. 6, 2005

(54) QUICK SAVE SYSTEM AND PROTOCOL, MONITOR PROGRAM AND SMART BUTTON FIRMWARE OF THE SAME

(76) Inventor: Tom Learmonth, 1202 E. Wakeham Ave., Santa Ana, CA (US) 92705

( * ) Notice: Subject to any disclaimer, the term of this patent is extended or adjusted under 35 U.S.C. 154(b) by 4 days.

(21) Appl. No.: 10/449,225

(22) Filed: May 30, 2003

(65) Prior Publication Data

US 2004/0243749 A1 Dec. 2, 2004

(51) Int. Cl.[7] .............................................. G06F 13/12

(52) U.S. Cl. .............................. 710/74; 710/2; 710/13; 710/73

(58) Field of Search ........................... 710/2, 8, 13, 72, 710/74

(56) References Cited

U.S. PATENT DOCUMENTS

2001/0021965 A1 * 9/2001 Yokota et al. .............. 711/163
2002/0049758 A1 * 4/2002 Koseki ........................ 707/10
2003/0041284 A1 * 2/2003 Mambakkam et al. ........ 714/15

FOREIGN PATENT DOCUMENTS

GB 2391252 A * 2/2004 ............. E06B/7/36

* cited by examiner

*Primary Examiner*—Jeffrey Gaffin
*Assistant Examiner*—Alan Chen
(74) *Attorney, Agent, or Firm*—Law Offices of John Chupa & Associates

(57) ABSTRACT

The present invention provides a quick save system, connecting to a computer via an interface, and executing data saving process by the computer, which comprises: a housing; an optical drive, positioned in the housing for accessing an optical media; a reader, positioned in the housing, having a smart button firmware and at least one slot therein for accessing the data of at least one flash memory card inserted in the slot; and at least one push button for actuating a process; thereby, the consumer can insert the at least one flash memory card into the slot, and press the button for actuating at least one computer process task to execute data saving between the optical drive, the reader and the computer. Furthermore, the present invention also discloses a protocol, an event monitor program and a smart button firmware of the quick save system.

11 Claims, 3 Drawing Sheets

QUICK SAVE SYSTEM AND PROTOCOL, MONITOR PROGRAM AND SMART BUTTON FIRMWARE OF THE SAME

FIELD OF THE INVENTION

The invention relates to a quick save system and a protocol, event monitor program and smart button firmware program of the quick save system. The event will be launched and executed by at least one process actuating at least one button of the quick save system, wherein, the process such as data archival, transmission, burning, editing, printing, sending by email, post to web, purchasing of services, encryption, decryption, actuating MP3 auto reading and playing, quick photo file reading and displaying and the consumer setting the computer process task themselves, results in time savings.

BACKGROUND OF THE INVENTION

Flash Card Media are often used in digital cameras when mobile storage of pictures/video and other data is required. Their small convenient size allows them to be inserted into small portable electronic camera devices for example. Images are stored to the flash media card in file format as pictures are taken, and later the images are moved elsewhere to clear the memory card for more pictures to be taken. Capacities of Flash Memory Cards currently range up to 4 GB; however due to cost reasons most cards used are much smaller (64 MB to 128 MB type).

Generally a consumer would store image files on a computer hard disk drive and later burn them to a CD disk. This involves the use of writing software and selecting of particular files. For example, there are some products in the market that integrate a reader and a write-able optical driver together. These products can burn the data of the flash memory card of the reader to the disk of the write-able optical driver for storing data.

However, these products can only burn the data of the reader to the disk, but cannot connect to the computer and do any task exclusive data burning, such as data archival, transmission, burning, editing, printing, sending by email, post to web, purchasing of services, encryption, decryption, actuating MP3 auto reading and playing, quick photo file reading and displaying and the consumer setting the computer process task themselves, results in time savings.

SUMMARY OF THE INVENTION

To solve the above problems, it is an advantage of the present invention to provide a quick save system to automate archival of flash card media data to CD disk. The event will be launched and executed by at least one process actuating at least one button of the quick save system, wherein, the process such as data archival, transmission, burning, editing, printing, sending by email, post to web, purchasing of services, encryption, decryption, actuating MP3 auto reading and playing, quick photo file reading and displaying and the consumer setting the computer process task themselves, results in time savings.

To solve the above problems, it is another advantage of the present invention to provide a USB Mass Storage device event protocol positioned between the computer and the reader. The events actuated by the at least one button such as data archival, transmission, burning, editing, printing, sending by email, post to web, purchasing of services, encryption, decryption, actuating MP3 auto reading and playing, quick photo file reading and displaying and the consumer setting the computer process task themselves can be executed reliably by the computer and the reader by the USB Mass Storage device event protocol.

To solve the above problems, it is still another advantage of the present invention to provide a USB Mass Storage device event program installed in the computer. The events actuated by the at least one button can be detected by the USB Mass Storage device event program and executed reliably by the computer and the reader.

To solve the above problems, it is still another advantage of the present invention to provide a smart button firmware program installed in the reader. The events actuated by the at least one button can be detected by the smart button firmware program and notify the computer to execute the relative processes.

To accomplish the above advantages of the present invention, there is provided a quick save system that comprises: a housing; an optical drive, positioned in the housing for accessing an optical media; a reader, positioned in the housing, having a smart button firmware and at least one slot therein for accessing the data of at least one flash memory card inserted in the slot; and at least one push button for actuating a process; thereby, the consumer can insert the at least one flash memory card into the slot, and press the button for actuating at least one computer process task to execute data saving between the optical drive, the reader and the computer.

To accomplish the above advantages of the present invention, there is provided a USB Mass Storage device event protocol that comprises the steps of: getting information of available flash memory cards inserted in the slots; recognizing file systems of the flash memory cards, such as FAT12, FAT16 and FAT32, or NTFS; converting logical block address to physical block address; setting a safety communication sector; the USB Mass Storage device event program starting polling UMS event; the smart button firmware returning an identify header to acknowledge the USB Mass Storage device event program the event handshake is success; and the smart button firmware appending button-event to the USB Mass Storage device event program.

To accomplish the above advantages of the present invention, there is provided a USB Mass Storage device event program that comprises the steps of: detecting logical UMS devices; getting optical driver information and device ID; reading those file system information of each UMS devices; setting a safety sector, last sector of FAT2, for a communication entry; polling and /or waiting expected button-event from UMS devices; launching optical driver button and import contents of UMS devices into source area; ready to burn data to the optical driver.

To accomplish the above advantages of the present invention, there is provided a smart button firmware program that comprises the steps of: detecting physical UMS devices; reading sector 0 and getting partition information of each UMS devices; computing offset between logical address and physical address; assigning a safety physical sector, last sector of FAT2, for a communication entry; checking whether it is a safety polling command issued by the USB Mass Storage device event program; notifying an identify header handshake to USB Mass Storage device event program; sending button-event to USB Mass Storage device event program.

The novel features of the invention are set forth with particularity in the appended claims. The invention will be best understood from the following description when read in conjunction with the accompanying drawings.

DESCRIPTION OF THE PREFERRED EMBODIMENTS

The following detailed description illustrates the invention by way of example, not by way of limitation of the principles of the invention. This description will clearly enable one skilled in the art to make and use the invention, and describes several embodiments, adaptations, variations, alternatives, and uses of the invention. The description includes what are presently believed to be the best modes of carrying out the invention.

Figure 1:
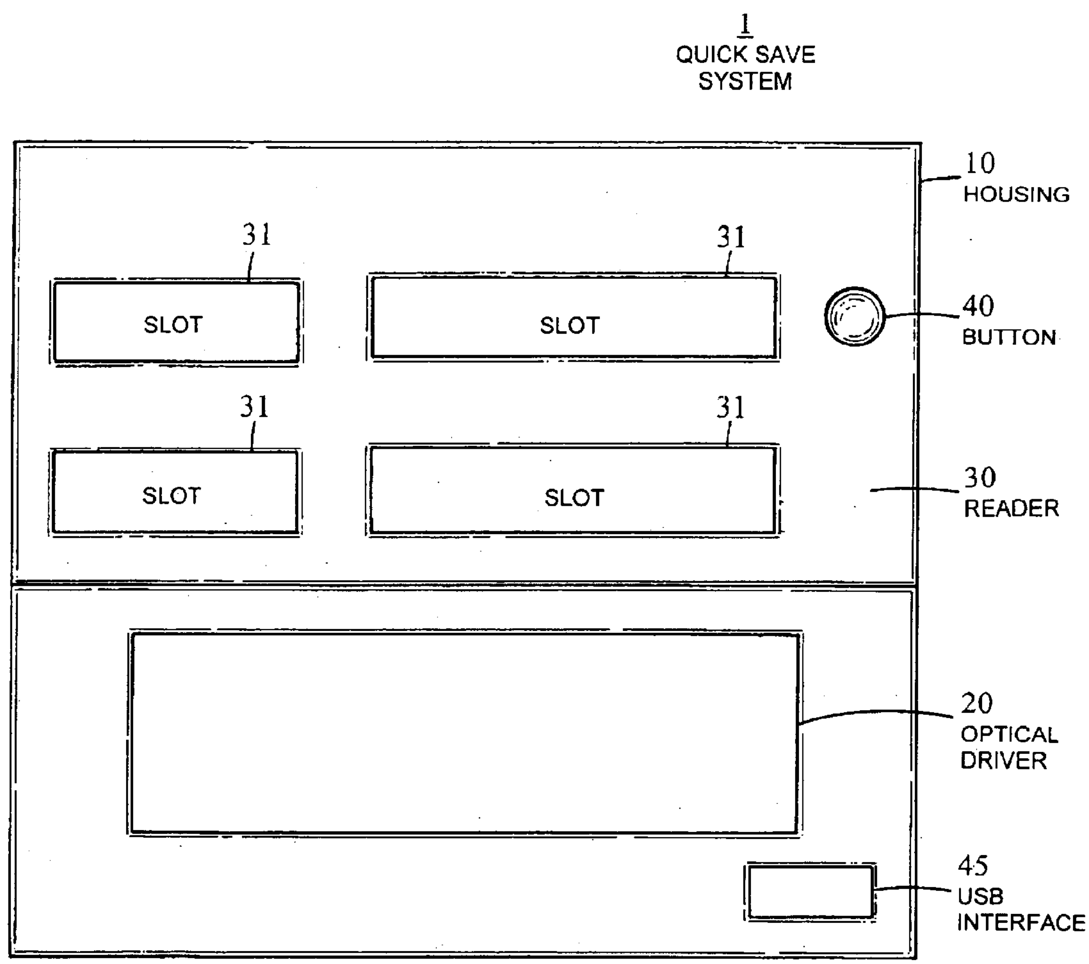
FIG. 1 shows a block diagram of a quick save system in accordance with an embodiment of the present invention.

Referring to FIG. 1, which shows block diagram of a quick save system in accordance with an embodiment of the present invention. As shown in FIG. 1, the quick save system 1 of present invention is connected to a computer 50(please refer FIG. 2) by an interface, and executed data saving process by the computer 50, which comprises: a housing 10; a optical driver 20; a reader 30; and at least one button 40.

Wherein, the housing 10 is positioned inside the 5.25" bay of the computer 50 preferably or the housing 10 is stand-alone and can be connected to the computer 50 by a cable 60 and an interface 45. Wherein, the optical driver 20 is a CDRW, DVD+RW, DVD−RW or DVD Rom/CDRW preferably so as to execute data burning. The reader 30 connected to the computer 50 by the cable 60 comprises at least one slot 31 and a smart button firmware 32, wherein, the slot 31 can be inserted into at least one flash memory card, such as CF I, CF II, Micro Drive, SD, MMC, SMC, MS, MS Pro, XD, Smart card, SIM (GSM subscriber identity card), PC card (PCMCIA). Some cards can work in the same type of slot 31, and some have a unique slot 31. The button 40 can be positioned on the housing 10, the optical driver 20 or the reader 30, thereby, upon the button 40 is actuated, the smart button firmware 32 detecting the event and determining the object of the event (such as data archival, transmission, burning, editing, printing, sending by email, post to web, purchasing of services, encryption, decryption, actuating MP3 auto reading and playing, quick photo file reading and displaying and the consumer setting the computer process task themselves, etc) and sending the relative information of the event to the computer 50 so as to execute the data processing (such as data archival, transmission, burning, editing, printing, sending by email, post to web, etc) between the optical driver 20, the reader and the computer 50. Wherein, the interface 45 is a USB interface (or IDE, SATA, Firewire, or SCSI interface), and the reader 30 can be connected to the computer 50 by the USB interface 45 (or IDE, SATA, Firewire, or SCSI interface), furthermore, the optical driver 20 and the reader 30 can share the USB interface 45 (or IDE, SATA, Firewire, or SCSI interface) and connected to the computer 50 by the shared USB interface 45.

Figure 2:
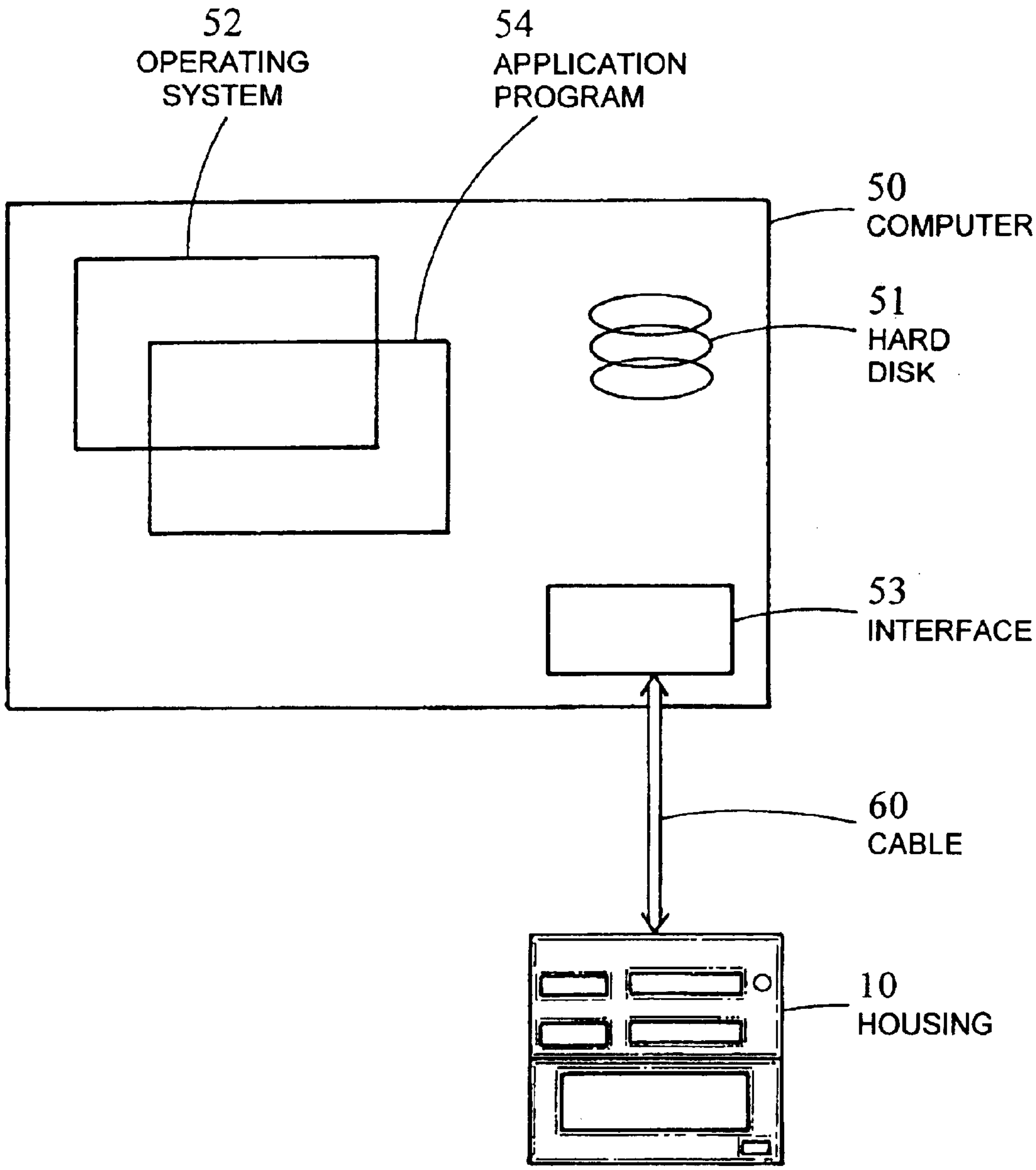
FIG. 2 shows a block diagram of a quick save system and computer configuration in accordance with an embodiment of the present invention.

Referring to FIG. 2, which shows a block diagram of a quick save system and computer configuration in accordance with an embodiment of the present invention, As shown in FIG. 2, the quick save system 1 of the present invention is connected to a computer 50 by a cable 60, and executed data saving process by the computer 50, wherein the computer comprises: at least one hard disk 51; a operating system 52 and an interface 53.

Wherein, the hard disk 51 is used to store the operating system 52, application program 54 or data and can be any type, any interface hard disk, such as IDE, SCSIS, or ATA interface hard disk. The operating system 52 is preferably MICROSOFT WINDOWS XP® Software operating system, due to the WINDOWS XP® SOFTWARE operating system has native burning program that can conveniently collocate with the quick save system 1 of the present invention. However, the quick save system 1 of the present invention can also collocate with the other MICROSOFT WINDOWS 2000® Software, WINDOWS ME® Software OR WINDOWS98 SE® Software operating systems, and the consumer must install additionally at least one application program 54 of the optical driver 20 in the above-mention operating system before using. The interface 53 connected between the quick save system 1 and the computer 50 can be a USB interface (or IDE, SATA, Firewire, or SCSI interface), and the reader 30 can be connected to the computer 50 by the USB interface 45 (or IDE, SATA, Firewire, or SCSI interface), furthermore, the computer 50 can be installed into at least one application program to execute the burning process of the optical driver 20.

Wherein, the reader 30 comprises at least one micro-controller (not shown, normally based upon an industry standard 8051), one or more memory slot 31 and an interface 45. Wherein, the micro-controller executes the firmware 32 for the reader 30 and one or more slots 31 for flash card media to be inserted into.

The firmware 32, either within a small OTP or Flash chip or within the micro-controller chip itself, controls the functioning of the micro-controller. The flash memory card reader 30 must know the file structure and data/control interface for each type of flash card supported.

The reader 30 also needs an interface 45 for connecting to the computer 50. The interface 45 can be a USB interface (or IDE, SATA, Firewire, or SCSI interface), and the reader 30 can be connected to the computer 50 by the USB interface 45 (or IDE, SATA, Firewire, or SCSI interface).

Figure 3:
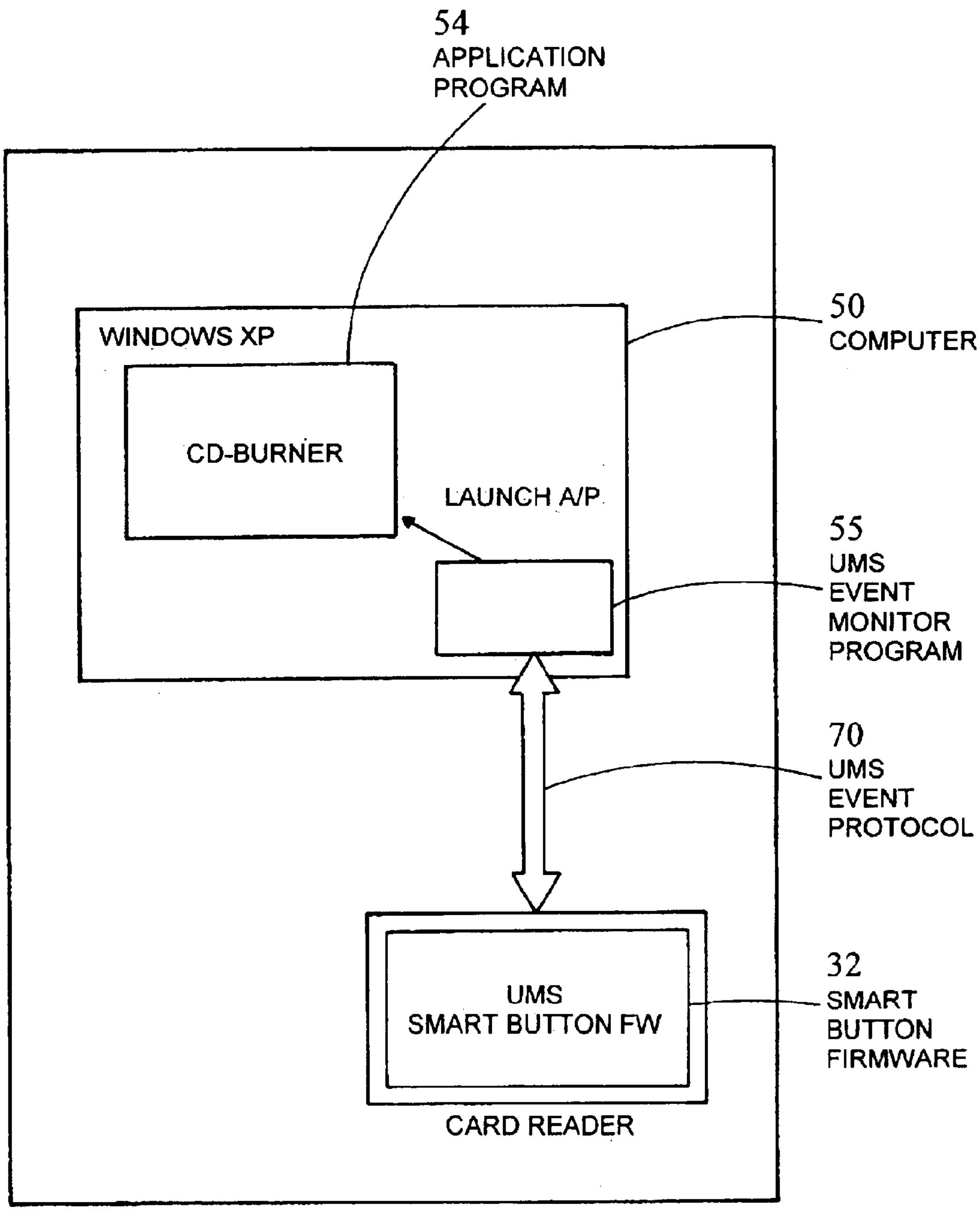
FIG. 3 shows a block diagram of the USB Mass Storage device event protocol, the USB Mass Storage device event program and the smart button firmware program configuration in accordance with an embodiment of the present invention.

Referring to FIG. 3, which shows a block diagram of the USB Mass Storage device event protocol, the USB Mass Storage device event program and the smart button firmware program configuration in accordance with an embodiment of the present invention. As shown in FIG. 3, the quick save system 1 of present invention is connected to a computer 50 by the cable 60, and a operating system and an UMS event monitor program 55 (USB Mass Storage Event Monitor Program) are installed in the computer 50. Wherein, the operating system 52 is preferably MICROSOFT WINDOWS XP® Software operating system, due to the Windows XP operating system has native burning program that can conveniently collocate with the quick save system 1 of the present invention. However, the quick save system 1 of the present invention can also collocate with the others MICROSOFT WINDOWS 2000® Software, Windows ME or Windows 98 SE operating system, and the consumer must install additionally at least one application program 54 of the optical driver 20 in the above-mention operating system before using for co-operating with the UMS event monitor program 55. The smart button firmware 32 is installed in the reader 30, and USB Mass Storage device event protocol 70 is positioned between the UMS event monitor program 55 and the smart button firmware 32 to monitor and manage the event there into.

Wherein, the UMS event protocol 70 comprising the steps of: getting information of available flash memory cards inserted in the slots; recognizing file systems of the flash memory cards, such as FAT12, FAT16 and FAT32, or NTFS; converting logical block address to physical block address; setting a safety communication sector; the USB Mass Storage device event program 55 starting polling UMS event; the smart button firmware 32 returning an identify header to acknowledge the USB Mass Storage device event program 55 the event handshake is successful; and the smart button firmware 32 appending button-event to the USB Mass Storage device event program 55.

Wherein, the flash memory card comprises at least one of a CF I, CF II, Micro Drive, SD, MMC, SMC, MS, MS Pro, XD, Smart card, SIM (GSM subscriber identity card), PC card (PCMCIA). Upon the button 40 is actuated, the smart button firmware 32 sending at least one button-event to the computer 50 via interface 45 and 53, and actuating the operating system 52 or the application programs 54 and executing at least one computer process task, such as data archival, transmission, burning, editing, printing, send by email, post to web, purchasing of services, encryption, decryption, actuating MP3 auto reading and playing, quick photo file reading and displaying and the consumer can set the computer process task themselves, results in time savings.

Wherein, the UMS event monitor program 55 is installed in the computer 50. The UMS event monitor program 55 is similar to the Still Image Event Monitor of the Still Image Class of Microsoft, the different is that the Still Image Class is suitable for the scanner for operating conveniently, but the UMS event monitor program 55 is used for monitoring and managing the events generated by the UMS device 30, which comprises the steps of: detecting logical UMS devices 30; getting optical driver 20 information and device ID; reading those file system information of each UMS devices 30; setting a safety sector, last sector of FAT2, for a communication entry; polling and/or waiting expected button-event from UMS devices 30; launching optical driver 20 button 40 and import contents of UMS devices 30 into source area; ready to bum data to the optical driver 20.

Wherein, the smart button firmware 32 detects consumer actuation of at least one button 40 on the reader 30, while the actuation time of the button 40 is less than a specific time (such as 3 seconds), the smart button firmware 32 will make the last inserting flash memory card as the source and the optical media 20 as the destination; while the actuation time of the button 40 is equal or over the specific time (such as 3 seconds), the smart button firmware 32 will make all inserted flash memory cards as the source and the optical media as the destination. The specific time of the embodiment of the present invention is preferably 3 seconds and can be adjusted when needed.

Wherein, the smart button firmware 32 is installed in the micro-controller of the reader 30 for controlling the operation of the reader 30, which comprises the steps of: detecting physical UMS devices 30; reading sector 0 and getting partition information of each UMS devices 30; computing offset between logical address and physical address; assigning a safety physical sector, last sector of FAT2, for a communication entry; checking whether it is a safety polling command issued by the USB Mass Storage device event program 55; notifying an identify header handshake to USB Mass Storage device event program 55; sending button-event to USB Mass Storage device event program 55.

Now taking an example to explain how the smart button firmware 32, the USB Mass Storage device event program 55 and the USB Mass Storage device event protocol 70 work when burning the data of the flash memory card to the disk in the optical driver 20. At first, the smart button firmware 32 detecting that any type flash memory card is inserted into any slots 31; if a flash memory card is inserted into the slots 31, the smart button firmware 32 will read the file system of each flash memory card; getting the information of available flash memory cards inserted in the slots 31; reading sector 0 and getting partition information of each UMS devices 30 computing offset between logical address and physical address; assigning a safety physical sector, last sector of FAT2, for a communication entry; checking whether it is a safety polling command issued by the USB Mass Storage device event program 55, such as data archival, transmission, burning, editing, printing event, etc; while the consumer choosing the data burning event, the smart button firmware 32 detects consumer actuation of the at least one button 40 on the reader 30, while the actuation time of the button 40 is less than 3 seconds, the smart button firmware 32 will make the last inserting flash memory card as the source and the optical media 20 as the destination; while the actuation time of the button 40 is equal or over 3 seconds, the smart button firmware 32 will make all inserted flash memory cards as the source and the optical media as the destination and notifying an identify header handshake to the USB Mass Storage device event program 55 for actuating the burning program 54 of the optical driver 20 (such as native burning program of the XP operating system or other burning application program installed additionally); reading the contents of the flash memory cards to the source (for example the hard disk 51) and waiting the confirmation from the consumer to bum data to the disk in the optical driver 20. Although, the above-mention taking an data burning process as example to explain how the present invention works, but the button 40 of the present invention can also execute other process such as transmission, editing, printing, send by email, post to web, purchasing of services, encryption, decryption, actuating MP3 auto reading and playing, quick photo file reading and displaying and the consumer can set the computer process task themselves, results in time savings.

While the invention has been described with reference to a preferred embodiment thereof, it is to be understood that modifications or variations may be easily made without departing from the spirit of this invention, which is defined by the appended claims.

What is claimed is:

1. A quick save system, connecting to a computer via an interface, and executing data saving process by said computer, which comprises:

a housing;

an optical drive, positioned in said housing for accessing an optical media;

a reader, positioned in said housing, having a smart button firmware and at least one slot therein for accessing the data of at least one flash memory card inserted in said slot; and at least one push button for actuating a process;

thereby, the consumer can insert said at least one flash memory card into said slot, and press said button for actuating at least one computer process task to execute data saving between said optical drive, said reader and said computer, wherein, both said computer and said reader has an USB interface respectively, and USB Mass Storage (UMS) monitor program is installed in said computer, and said reader is connected to said computer by an USB cable, a UMS event monitor protocol comprising the steps of:

getting information of available flash memory cards inserted in said slots;

recognizing file systems of said flash memory cards, such as FAT12, FAT16 and FAT32, or NTFS;

converting logical block address to physical block address;

setting a safety communication sector;

said USB Mass Storage device event program starting polling at least one UMS event;

said smart button firmware returning an identify header to acknowledge said USB Mass Storage device event program the event handshake is successful; and said smart button firmware appending button-event to said USB Mass Storage device event program.

2. The UMS event monitor protocol according to claim 1, wherein said flash memory card comprises at least one of a CF I, CF II, Micro Drive, SD, MMC, SMC, MS, MS Pro, XD, Smart card, SIM (GSM subscriber identity card), PC card.

3. The UMS event monitor protocol according to claim 1, wherein said computer runs Microsoft Windows XP, Windows 2000, Windows ME or Windows 98 SE operating system.

4. The UMS event monitor protocol according to claim 1, wherein said USB Mass Storage device is a reader.

5. The UMS event monitor protocol according to claim 1, wherein an event initiated by the push button and launched by said USB Mass Storage device is at least one of data archival, transmission, burning, editing, printing, send by email, post to web, purchasing of services, encryption, decryption, actuating MP3 auto reading and playing, quick photo file reading and displaying and said consumer can set said computer process task themselves, results in time savings.

6. The UMS event monitor protocol according to claim 1, wherein said UMS event monitor program further comprising the steps of:

detecting said logical UMS devices;

getting optical driver information and device ID;

reading those file system information of each UMS devices;

setting a safety sector, last sector of FAT2, for a communication entry;

polling and/or waiting expected button-event from said UMS devices;

launching optical driver button and import contents of UMS devices into source area; and ready to burn data to said optical driver.

7. The UMS event monitor protocol according to claim 1, wherein said smart button firmware program further comprising the steps of:

detecting physical UMS devices;

reading sector 0 and getting partition information of each UMS devices;

computing offset between logical address and physical address;

assigning a safety physical sector, last sector of FAT2, for a communication entry;

checking whether it is a safety polling command issued by said USB Mass Storage device event program;

notifying an identify header handshake to said USB Mass Storage device event program; and sending said button-event to said USB Mass Storage device event program.

8. The smart button firmware program of claim 1, wherein said smart button firmware program comprises the steps of:

detecting physical UMS devices;

reading sector 0 and getting partition information of each UMS devices;

computing offset between logical address and physical address;

assigning a safety physical sector, last sector of FAT2, for a communication entry;

checking whether it is a safety polling command issued by said USB Mass Storage device event program;

notifying an identify header handshake to said USB Mass Storage device event program; and sending said button-event to said USB Mass Storage device event program.

9. The smart button firmware program according to claim 8, wherein said flash memory card comprises at least one of a Compact Flash Memory card, a Smart Media card, a Memory Stick, a Multi Media card, a Secure Digital card, a IBM Microdrive, a xD Flash card or a PC Card.

10. The smart button firmware program according to claim 8, wherein said computer runs Microsoft Windows XP , Windows 2000, Windows ME or Windows98 SE operating system.

11. The smart button firmware program according to claim 8, wherein an event initiated by the push button and launched by said button is at least one of data archival, transmission, burning, editing, printing, send by email, post to web, purchasing of services, encryption, decryption, actuating MP3 auto reading and playing, quick photo file reading and displaying and said consumer can set said computer process task themselves, results in time savings.

* * * * *